United States Patent
Shaw et al.

(10) Patent No.: US 10,574,867 B2
(45) Date of Patent: Feb. 25, 2020

(54) THREE DIMENSIONAL IMAGING DEVICE

(75) Inventors: David I. Shaw, Portland, OR (US); William C. Deleeuw, Beaverton, OR (US); Tondra J. Schlieski, Beaverton, OR (US); Lucas B. Ainsworth, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1855 days.

(21) Appl. No.: 13/527,796

(22) Filed: Jun. 20, 2012

(65) Prior Publication Data

US 2013/0342650 A1    Dec. 26, 2013

(51) Int. Cl.
| | |
|---|---|
| *H04N 5/225* | (2006.01) |
| *H04N 17/00* | (2006.01) |
| *H04N 13/296* | (2018.01) |
| *H04N 5/232* | (2006.01) |

(52) U.S. Cl.
CPC .......... *H04N 5/2254* (2013.01); *H04N 5/232* (2013.01); *H04N 13/296* (2018.05); *H04N 17/002* (2013.01)

(58) Field of Classification Search
CPC .................................................. H04N 5/2254
USPC ............................................................. 348/46
See application file for complete search history.

(56) References Cited

U.S. PATENT DOCUMENTS

| | | | | |
|---|---|---|---|---|
| 5,182,738 | A | * | 1/1993 | Yoshikawa .......... G11B 7/0935 359/819 |
| 2005/0237385 | A1 | * | 10/2005 | Kosaka ................. G01B 11/00 348/42 |
| 2006/0187312 | A1 | * | 8/2006 | Labaziewicz et al. .... 348/218.1 |
| 2006/0187338 | A1 | * | 8/2006 | May et al. ..................... 348/375 |
| 2012/0147146 | A1 | * | 6/2012 | Namgoong .......... H04N 13/239 348/47 |
| 2013/0113894 | A1 | * | 5/2013 | Mirlay ............................ 348/47 |

* cited by examiner

*Primary Examiner* — Dave Czekaj
*Assistant Examiner* — Berteau Joisil
(74) *Attorney, Agent, or Firm* — Trop, Pruner & Hu, P.C.

(57) ABSTRACT

An imaging device may include a housing and a pair of lenses mounted in the housing. A mechanism maintains the lenses in a horizontal orientation when the housing is rotated about an imaging axis.

8 Claims, 4 Drawing Sheets

THREE DIMENSIONAL IMAGING DEVICE

BACKGROUND

This relates generally to imaging devices for capturing three-dimensional (3D) images.

A three-dimensional camera includes at least two imaging lenses that capture two different views of an imaged object. Both of these views may then be captured by two different image sensors or by different portions of a single image sensor. Then these two images are used to create the appearance of a three-dimensional object using a stereo pair.

However, a problem results when the lenses are not in the same horizontal orientation as the viewer's eyes. That is, when the imaging device is turned to a non-horizontal angle, such as a vertical angle, and the user is viewing the scene from a horizontal orientation, the resulting images may be improperly aligned for 3D viewing.

For example, if you want to take a whole body shot of a person with a standard 3D camera, you may turn the camera 90 degrees to place the long or landscape edge in a vertical or portrait orientation. This puts the two separate lenses in a vertical orientation, which does not match the viewer's horizontally positioned eyes. To view the image as a proper stereo pair, the viewer would need to either turn his or her head to a very unnatural "eyes vertical" position or turn the display such that the stereo pair is horizontal, even though the subject of the picture is now rotated 90 degrees.

BRIEF DESCRIPTION OF THE DRAWINGS

Some embodiments are described with respect to the following figures.

DETAILED DESCRIPTION

Figure 1:
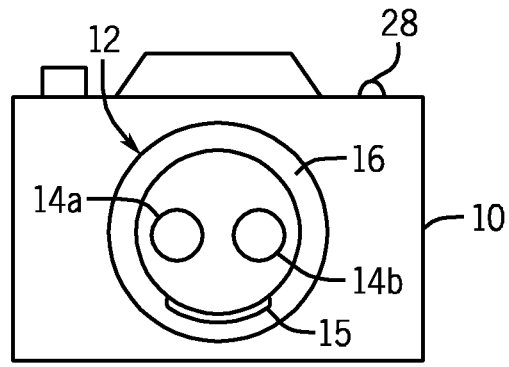
FIG. 1 is a front elevational view of an imaging device in a landscape orientation.

Referring to FIG. 1, an imaging device 10 may be a still or moving camera or any other device with an imaging capability, including a laptop computer, a cellular telephone, a mobile Internet device, a game, a telescope, binoculars or a television.

The imaging device 10 includes a tubular lens housing 12 that mounts a pair of lenses 14a and 14b. In one embodiment the lenses 14a and 14b may each be a single lens but, in other embodiments, sets of lenses may be used in place of single lenses. In addition the lenses may enable adjustable focal lengths. Also telephoto lenses may be used in some embodiments.

The lenses 14a and 14b are rotatably mounted, on cylindrical bearings for example, so that the lenses 14a and 14b may rotate as a unit, relative to the rest of the imaging device 10's housing around an axis parallel the camera's line of focus. In one embodiment, a weight 15 is positioned centrally below the two imaging lenses 14a and 14b.

Figure 2:
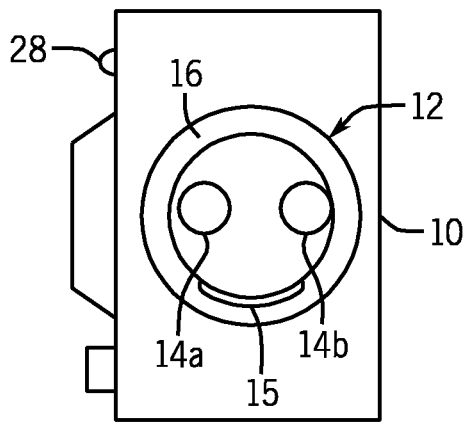
FIG. 2 is a front elevational view of the imaging device of FIG. 1 in a vertical or portrait configuration.

Then, when the imaging device is turned to the vertical or portrait orientation, shown in FIG. 2, the weight 15 automatically reorients the imaging lenses 14a and 14b to the same orientation shown in FIG. 1 in connection with the landscape mode. This is because the weight causes the lenses to automatically reorient by rotating the housing 12 on the bearings relative to the rest of the imaging device 10.

The lenses 14a and 14b may be mounted as a unit using a variety of other rotary mounting arrangements, including axles, journaled bearings, a gimbal and hinged mounted arrangements, to mention a few examples.

As a result of the rotary mounting of the lenses 14a and 14b, the lenses are always properly oriented so that the end user can view a captured stereo image pair in a normal, eyes horizontal orientation. This happens regardless of the angle of the imaging device relative to the imaged object.

Figure 3:
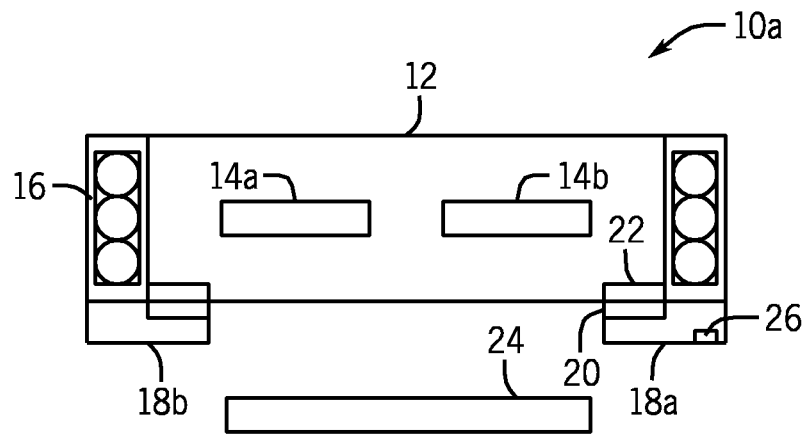
FIG. 3 is a cross-sectional view through another embodiment of an imaging device in accordance with another embodiment.

Referring to FIG. 3, in accordance with another embodiment, the lenses 14a and 14b may be mounted on a housing 12, which rotates on a bearing 16, for rotation about a central axis between the two lenses 14a and 14b. However, in this case, instead of simply using gravity to reorient the lenses, motors 18a or 18b may drive the rotary housing 12 relative to the rest of the imaging device housing 10.

In one embodiment, the motor 18 may include gear sets 20 and 22, one gear being located on the motor 18 and the other gear being located on the rotary lens housing 12. In one embodiment, an accelerometer 26 is provided which operates the motor to drive the housing 12 to position the lenses 14a and 14b in the horizontal configuration. In this way, the lenses are always horizontally aligned with an image sensor 24 for the two stereo images. In some embodiments two sensors may be used that rotate by a unit with the lens.

In some embodiments, the imaging device 10 may include an indicator, such as light emitting diode (LED) 28, which indicates when the imaging device is ready to take a picture, because the lens housing 12 has been oriented correctly. In another embodiment, a sound may be generated to indicate the lenses are oriented correctly. An indication may also be provided as an overlay over the imaged scene so that a user looking through a view finder can be advised when to capture an image pair.

Figure 4:
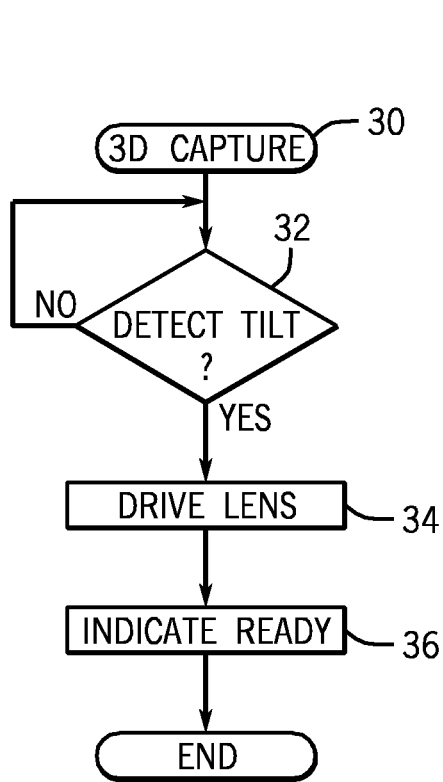
FIG. 4 is a flow chart showing a sequence of three dimensional image capture according to one embodiment.

Thus, referring to FIG. 4, a 3D capture sequence 20 may be implemented in software, firmware, and/or hardware. In software and firmware embodiments, it may be implemented by instructions stored on at least one non-transitory computer readable medium, such as a semiconductor, optical, or magnetic storage.

The sequence shown in FIG. 4 may begin by detecting an imaging device tilt, for example, using a tilt sensor 26, in one embodiment. When a tilt is detected, the lens housing 12 is driven using the motors 18a and 18b, as indicated in block 34. When the housing 12 is positioned appropriately for horizontal viewing as determined by the tilt sensor, a ready indication may be provided, as indicated in block 36. In one embodiment, this may be done by activating an indicator, such as the LED 28, shown in FIG. 1. Specifically the lenses are maintained in a side-by-side horizontal orientation.

Figure 5:
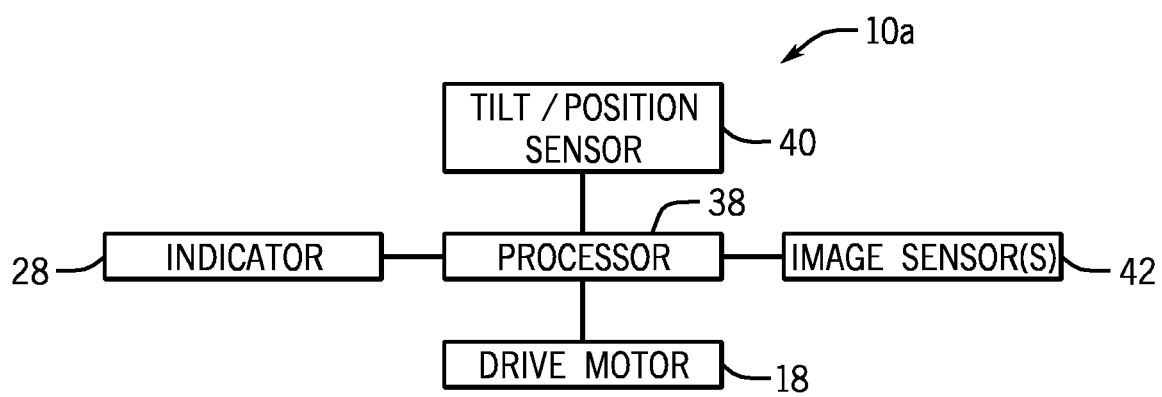
FIG. 5 is a system depiction for one embodiment.

Thus, referring to FIG. 5, one embodiment of an imaging device 10a may include a processor 38, coupled to a tilt/position sensor 40, an indicator 40, and the drive motors 18. The tilt sensor can use a mercury ball as one example.

In one embodiment, the processor 38 may also be coupled to an image sensor or sensors 42. In one embodiment, the processor may control which pixels in the image sensor or sensors are actually captured based on the position detected for the imaging device 10a. For example, a position sensor included in the tilt/position sensor 40 may capture the current position of the camera, lens, or image sensors and, based on that position, may determine which pixels to actually use, capture and store in the memory 44. Specifically, if the imaging device is in the landscape mode, a horizontal letter box set of pixels within the imaging array may be actually captured. Conversely, if the imaging device is in a portrait mode, an upright, rectangular box of pixels within the image sensor may actually be captured. As still another example, if the camera is at a 45 degree angle, a diamond-shaped pattern may be captured.

Figure 6:
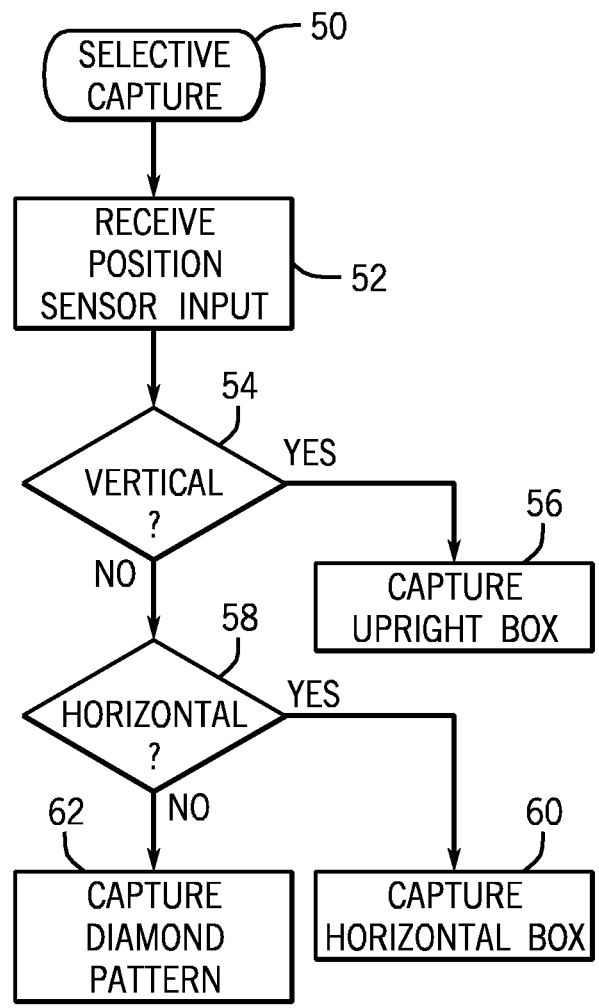
FIG. 6 is a flow chart for another embodiment.

Thus, referring to FIG. 6, in accordance with one embodiment, the sequence 50 may be implemented in software, firmware, and/or hardware. In software and firmware embodiments it may be implemented by computer executed instructions stored in a computer readable medium, such as a magnetic, optical, or semiconductor storage.

In one embodiment, the sequence begins by receiving an input from the position sensor, as indicated at block 52. This input enables the processor 38 to determine the orientation of the imaging device and, based on that orientation, to make certain decisions.

As indicated in block 54, if the imaging device is in a vertical orientation, corresponding to the portrait mode, those pixels corresponding to an upright rectangular box may be captured and sent to the storage (block 56). Conversely, if the imaging device is in a horizontal or landscape mode (diamond 58), pixels corresponding to a horizontal box having a horizontal, elongate axis may be captured and transferred to the storage (block 60). Conversely, if the imaging device is at a 45 degree angle, a diamond-shaped pattern of pixels may be captured and transferred to storage (block 62).

Figure 7:
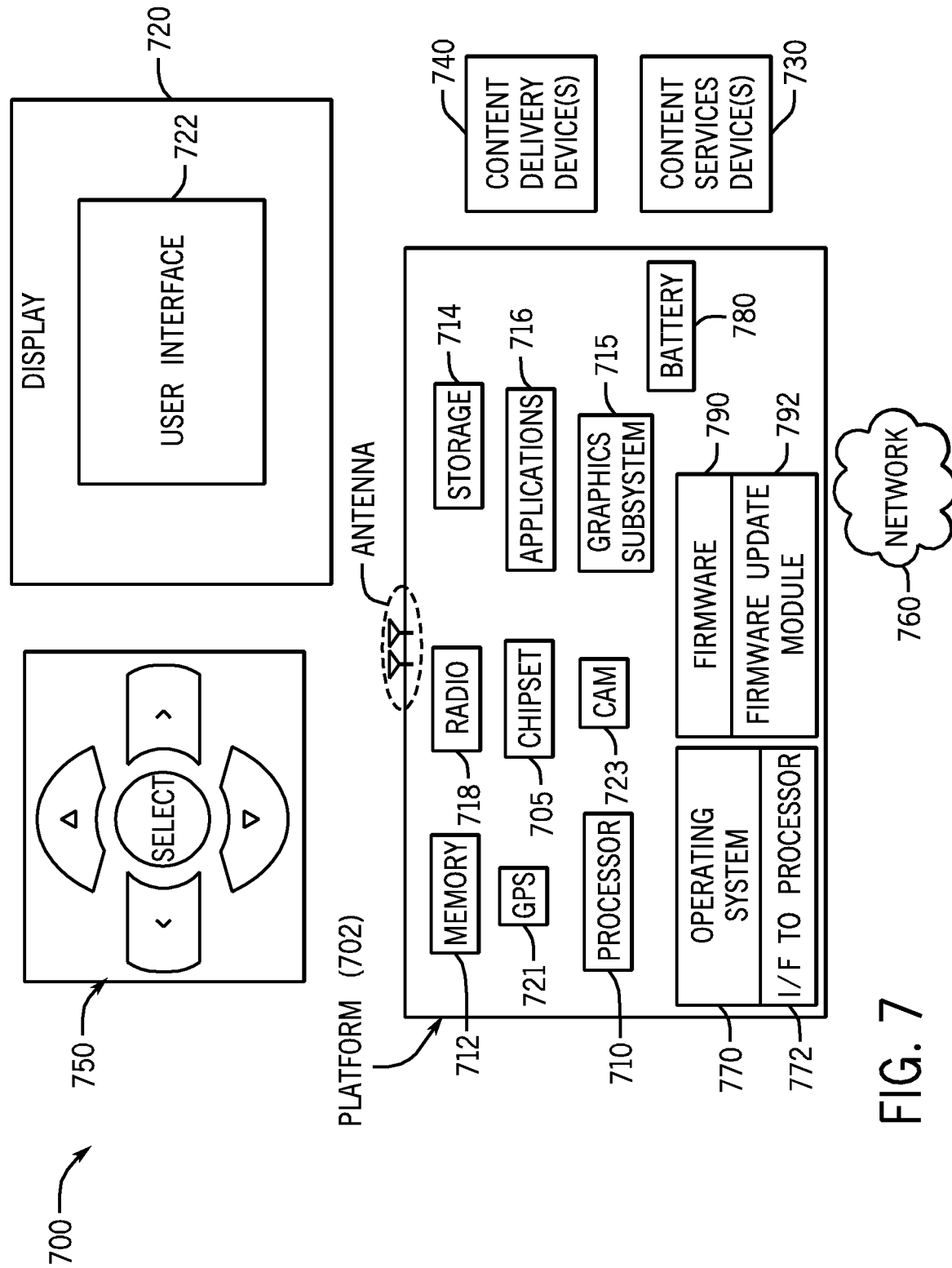
FIG. 7 is a system depiction for another embodiment.

FIG. 7 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716, global positioning system (GPS) 721, camera 723 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

In addition, the platform 702 may include an operating system 770. An interface to the processor 772 may interface the operating system and the processor 710.

Firmware 790 may be provided to implement functions such as the boot sequence. An update module to enable the firmware to be updated from outside the platform 702 may be provided. For example the update module may include code to determine whether the attempt to update is authentic and to identify the latest update of the firmware 790 to facilitate the determination of when updates are needed.

In some embodiments, the platform 702 may be powered by an external power supply. In some cases, the platform 702 may also include an internal battery 780 which acts as a power source in embodiments that do not adapt to external power supply or in embodiments that allow either battery sourced power or external sourced power.

The sequences shown in FIGS. 4 and 6 may be implemented in software and firmware embodiments by incorporating them within the storage 714 or within memory within the processor 710 or the graphics subsystem 715 to mention a few examples. The graphics subsystem 715 may include the graphics processing unit and the processor 710 may be a central processing unit in one embodiment.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

As described above, system 700 may be embodied in varying physical styles or form factors. FIG. 7 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Figure 8:
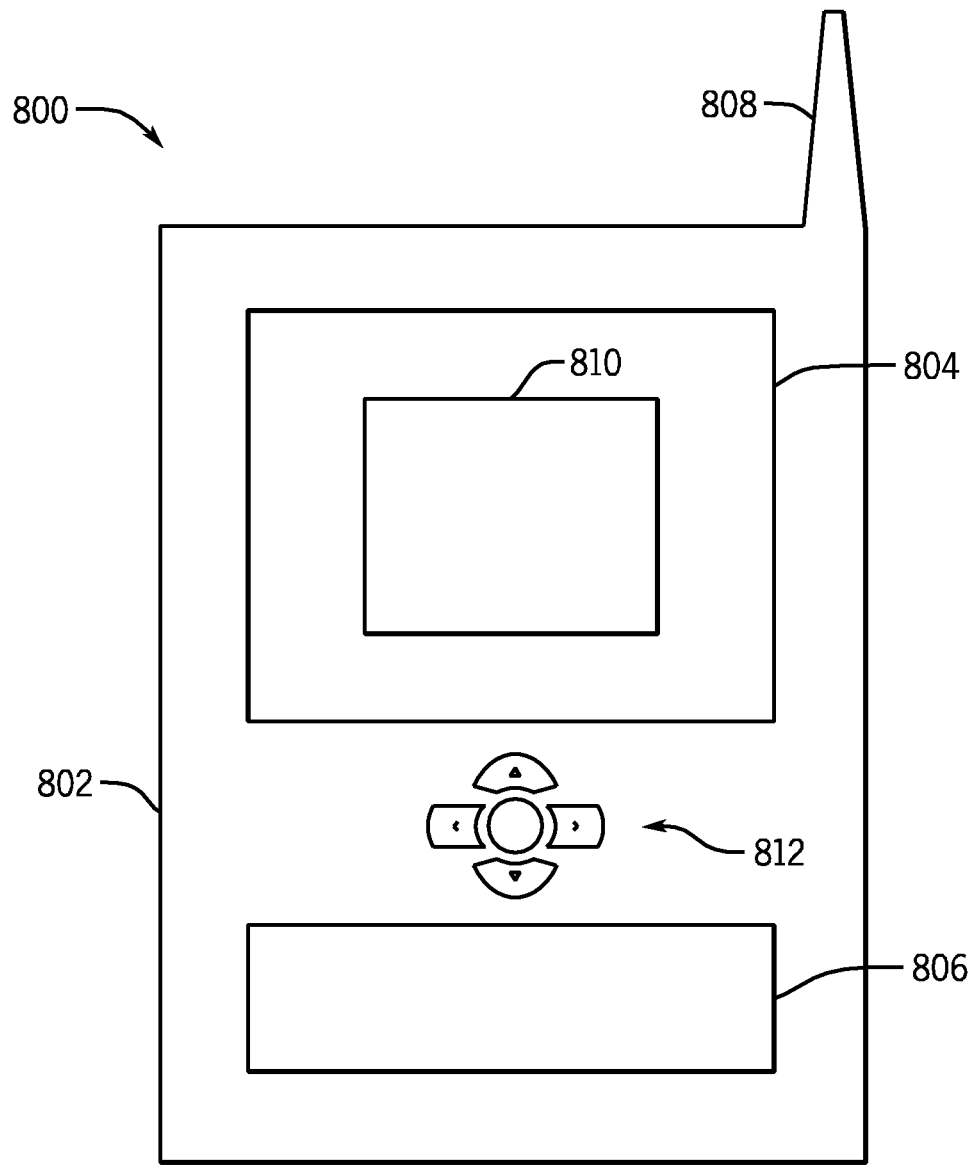
FIG. 8 is a front elevational view of another embodiment.

As shown in FIG. 8, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

What is claimed is:

1. An imaging device comprising:
   a housing;
   at least one image sensor in the housing;
   a lens pair mounted in the housing so as to maintain a side-by-side horizontal orientation when the housing is rotated about an imaging axis; and
   a lens assembly rotatable relative to the housing and the at least one image sensor, wherein the lens assembly is weighted to maintain the lens pair in the side-by-side horizontal orientation.

2. The device of claim 1 including an indicator to signal when the lens pair is in the side-by-side horizontal orientation.

3. The device of claim 2 wherein the indicator is a light.

4. The device of claim 3 wherein the light is on the outside of the housing.

5. The device of claim 1 including a position sensor to sense the position of the lens pair.

6. The device of claim 5 including a processor coupled to the position sensor and to the at least one image sensor.

7. The device of claim 6 wherein the processor to use information from the position sensor to determine what pixel data to capture.

8. The device of claim 7 wherein, based on the information from the position sensor, the processor to select one of a vertically aligned rectangle of pixels, a horizontally aligned rectangle of pixels, or a rectangle of pixels aligned between vertically and horizontally to capture and store.

* * * * *